Jan. 8, 1924.

W. MEREDITH

DEHYDRATOR

Filed Feb. 14, 1921

1,480,091

Inventor
Wynn Meredith
by Graham & Davis
Attorneys.

Patented Jan. 8, 1924.

1,480,091

UNITED STATES PATENT OFFICE.

WYNN MEREDITH, OF ALAMEDA, CALIFORNIA, ASSIGNOR TO PETROLEUM RECTIFYING COMPANY, OF SAN FRANCISCO, CALIFORNIA, A CORPORATION OF CALIFORNIA.

DEHYDRATOR.

Application filed February 14, 1921. Serial No. 444,948.

*To all whom it may concern:*

Be it known that I, WYNN MEREDITH, a citizen of the United States, residing at Alameda, county of Alameda, and State of California, have invented a new and useful Improvement in Dehydrators, of which the following is a specification.

My invention relates to dehydrators which are especially adapted to remove water from petroleum emulsions. Various inventors have attempted to remove this water by passing the emulsion through filters. Emulsion may be dehydrated in this manner, the water adhering to the filter cloth and collecting in masses which may be readily removed. The problem of removing water from such an emulsion is essentially one of agglomeration. The water particles in any such emulsion are extremely fine and if they can be forced together, they form larger particles which can be readily settled out by gravity. All such filtering methods which have been proposed to date are, however, open to the objection that sand, silt and various tarry and waxy substances also tend to adhere to the filter cloth which soon becomes clogged so that further passage of the oil is impossible or in many cases, the filter cloth is broken by the pressure if any is exerted for the purpose of forcing oil therethrough.

I propose to separate water from such an emulsion by passing it through loose material and which is so placed that it does not become clogged as in the ordinary filter.

Referring to the drawing which is for illustrative purposes only,

Figure 1:
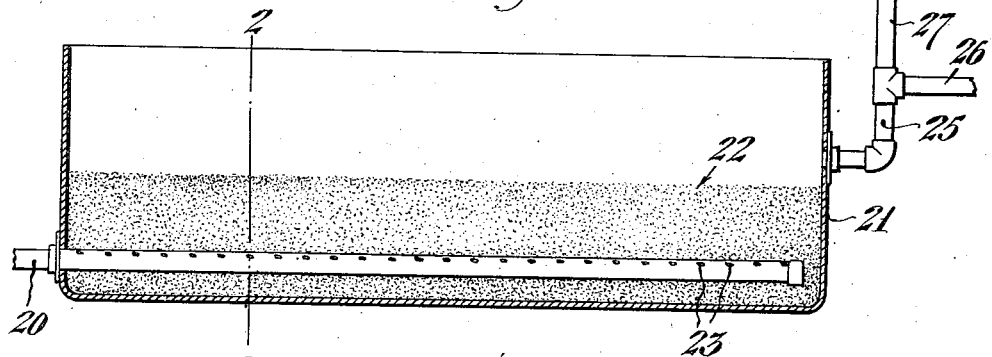
Fig. 1 is a side elevation partly in section of one form of filter trough used in the practice of my invention.
Figure 2:
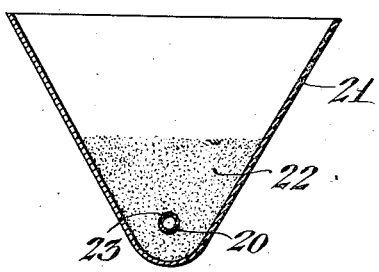
Fig. 2 is a section on a plane represented by the line 2—2 of Fig. 1.
Figure 3:
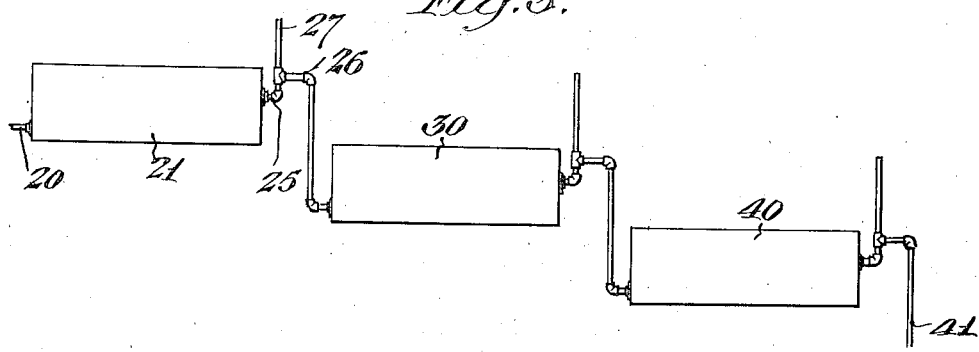
Fig. 3 is a battery of such filtering trough.

In the practice of my invention, the emulsion to be treated is forced through a pipe 20 into the bottom of a trough 21 which is partially filled with finely divided or pulverized material 22. This material must be heavier than water and it must be of such a nature that water tends in a measure to adhere thereto. I have found that clean beach sand thoroughly wetted with water before starting operations forms an excellent medium. The emulsion is forced through the medium 22 in a series of small jets due to the fact that the pipe 20 is perforated as shown at 23. Each of these small jets tends to agitate and free the filtering material in the event that it becomes clogged, the emulsion otherwise passing freely through the filtering material 22. In its passage through the filtering material 22, the emulsion is broken up and the fine water particles therein come in contact with and adhere to the grains of sand, each of which forms a nucleus about which a water drop is built up. The water in large masses mixed with oil are delivered through a pipe 25 into a pipe 26, a vent 27 being provided to prevent siphoning. The pipe 26 passes downwardly and into a second filter trough 30, the oil and water from this filter trough passing in turn to a third filter trough 40. The oil and water are finally delivered through a pipe 41 to storage, not shown. In this storage, the oil is allowed to stand for a period sufficiently long to allow the large drops of water which have been formed through the successive passage of the emulsion through the material 22 to settle out by gravity.

I claim as my invention:

1. A process of agglomerating water particles from an emulsion which comprises forcing the emulsion upwardly through a loosely held mass of comminuted material.

2. A process of agglomerating water particles from an emulsion which comprises forcing the emulsion upwardly in a series of fine jets through a loosely held mass of comminuted material.

In testimony whereof, I have hereunto set my hand at San Francisco, California, this 7th day of February, 1921.

WYNN MEREDITH.